United States Patent
Buechel, Jr. et al.

(10) Patent No.: US 7,226,396 B2
(45) Date of Patent: *Jun. 5, 2007

(54) REHABILITATION AND FITNESS TRAINER APPARATUS

(75) Inventors: Frederick Buechel, Jr., Naples, FL (US); Colin Hoobler, Portland, OR (US)

(73) Assignee: Balance Gym LLC, Naples, FL (US)

( * ) Notice: Subject to any disclaimer, the term of this patent is extended or adjusted under 35 U.S.C. 154(b) by 546 days.

This patent is subject to a terminal disclaimer.

(21) Appl. No.: 10/787,006

(22) Filed: Feb. 25, 2004

(65) Prior Publication Data

US 2004/0192516 A1  Sep. 30, 2004

Related U.S. Application Data

(63) Continuation-in-part of application No. 10/057,021, filed on Jan. 25, 2002, now Pat. No. 6,712,744.

(60) Provisional application No. 60/264,169, filed on Jan. 25, 2001.

(51) Int. Cl.
*A63B 22/00* (2006.01)
*A63B 23/00* (2006.01)

(52) U.S. Cl. .......................... 482/66; 482/148

(58) Field of Classification Search ............ 482/66–69; 135/65–67; 280/87.051, 29–30; 434/253, 434/255

See application file for complete search history.

(56) References Cited

U.S. PATENT DOCUMENTS

| | | | | | |
|---|---|---|---|---|---|
| 2,278,901 | A | * | 4/1942 | Smock | 482/67 |
| 4,226,413 | A | * | 10/1980 | Daugherty | 482/67 |
| 4,251,105 | A | * | 2/1981 | Barker | 297/6 |
| 5,320,122 | A | * | 6/1994 | Jacobson et al. | 135/66 |

* cited by examiner

*Primary Examiner*—Fenn C. Mathew
(74) *Attorney, Agent, or Firm*—Anthony J. Casella; Gerald E. Hespos

(57) ABSTRACT

A rehabilitation and fitness trainer apparatus includes a handle frame of generally U-shaped configuration, with two telescopic members attached at an angle to the base of the U-shaped handle portion, a generally U-shaped base frame including an elongated cross bar and two side members which extend rearwardly and at an outwardly extending angle from the elongated cross bar, and with the cross bar including a pair of elongated members that extend generally upwardly and rearwardly for cooperating and telescopingly engaging the pair of telescopic members extending from the handle frame. A locking device is provided for vertically adjusting and maintaining the vertical distance between the handle frame and the base frame in order to accommodate a wide variety of users of the apparatus.

25 Claims, 12 Drawing Sheets

REHABILITATION AND FITNESS TRAINER APPARATUS

BACKGROUND OF THE INVENTION

This continuation-in-part application claims priority based upon U.S. patent application Ser. No. 10/057,021 filed Jan. 25, 2002, now U.S. Pat. No. 6,712,744 which, in turn, claims priority based upon U.S. Provisional Application Ser. No. 60/264,169 filed on Jan. 25, 2001.

FIELD OF THE INVENTION

The subject invention relates to physical fitness devices, and more particularly to devices designed for rehabilitation and fitness training. The rehabilitation and fitness trainer of the subject invention targets senior adults as well as those individuals recovering from major joint surgery (e.g. hip or knee replacement). Furthermore, the subject invention relates to a device that is portable, easy to store and accommodates a wide variety of users, including users who are wheel chair bound.

DESCRIPTION OF THE RELATED ART

Exercise regimens are necessary for individuals desiring to improve their physical well-being, individuals seeking to maintain their physical health, or those that are recovering from injuries or surgery. Although fitness facilities provide a wide range of equipment to meet those needs, the home-user is limited in his or her equipment choices.

In addition, there is growing concern that senior adults require this type of home exercise more than younger adults. Senior adults are more susceptible to a variety of conditions including osteoporosis, falls, factures and balance control problems. While the conditions pose a risk for anyone, they are especially serious for senior adults who may be alone when the injury occurs and unable to summon for assistance, who incur injuries more easily than younger adults and who also recover more slowly than their younger brethren.

In addition, people recovering from hip or knee replacement surgery require lengthy periods of physical therapy. Usually this is a combination of out-patient physical therapy combined with an in-home exercise regimen. However, due to the limited selection of home equipment available to the patient, home exercise programs are limited in scope, especially to those patients who require a wheel chair for mobility.

One such device is the subject of U.S. Pat. No. 5,961,430 that issued to Zuckerman et al. on Oct. 5, 1999. Zuckerman et al. discloses a portable exercise apparatus intended for home use. This exercise apparatus comprises side frames that pivot about a front cross brace for folding into a storage position or unfolding into the operating position. These side frames have a total of four connection points to the support surface and are of a fixed size. Due to the fixed size, the device is not height adjustable for accommodating different sized users. Also, the device has four contact points with the support surface similar to that of a chair. This limited support means leads to a potentially unstable device while in use and can cause the user to fall if the device tips over, thereby defeating a goal of home exercise.

Another related device is disclosed in U.S. Pat. No. 3,410,553 that issued to Safford on Apr. 26, 1966. Safford discloses a structure for rehabilitation of individuals suffering from paraplegia. This device comprises a base with four legs terminating in a circular girt for supporting the patient during rehabilitation. Although this device is height adjustable, the user requires the assistance of another to enter and exit the device since the girt completely encircles the user's body. Also, this device does not include a means for the user to perform a variety of upper body exercises due to the mobility restricting girt.

U.S. Pat. No. 277,399 issued to Worthington on May 8, 1883 discloses another exercising apparatus. This apparatus has three supporting legs arranged in a triangular pattern, horizontal cross bars and stays connecting the front legs. The device may be disassembled for storage and has an opening for the user to enter, but suffers some of the shortcomings previously mentioned. Worthington's device is not capable of being adjusted to accommodate varying heights of the users. Also, it has only three legs and therefore three contact points on the support surface resulting in a device that may easily become unstable during the user's exercise program.

Finally, U.S. Pat. No. 3,521,881 that issued to Schaevitz on Jul. 28, 1970 discloses another device for exercising. This device comprises a front member, a rear member and two side members that include vertical elements. A pair of arm rest members are situated at the top of the vertical members with a horizontal bar extending between the arm rests. This device is more stable than others previously discussed but retains some of the disadvantages of the other devices. Since it has a rear support member that contacts the support surface, it is unusable for those individuals confined to a wheelchair. Also, it is not vertically adjustable to accommodate users of differing heights. Furthermore, due to the placement of the horizontal bar and the rectangular frame construction of the side members, users are restricted in the variety of exercises they are capable of performing.

Therefore, it is an object of the subject invention to provide an affordable device for a home exercise program.

It is another object of the subject invention to provide an easy to use device for home exercise, especially for users who require a wheel chair for mobility.

A further object of the subject invention is to provide a device that is vertically adjustable to accommodate a wide variety of users.

Another object of the subject invention is to provide an exercise device that is easily movable from one location to another.

It is a further object of the subject invention to provide an exercise device that is simple to use and permits wheelchair access.

Yet another object of the object invention is to provide an exercise device that supports a wide variety of exercises.

A further object of the subject invention is to provide an exercise device that is stable throughout all possible exercises.

SUMMARY OF THE INVENTION

The subject invention discloses several embodiments of an apparatus that overcomes the disadvantages of the prior art by disclosing a new and improved apparatus for exercising at home. This new and improved exercise apparatus comprises a frame having a plurality of side members, a horizontal cross bar, a plurality of vertical members attached to a bracket where each vertical member contains a telescoping member of smaller size, a generally U-shaped handle attached to the tubes and a plurality of wheels attached to the frame. Also, the exercise device has a plurality of feet on the bottom of the side members to minimize damage to the support surface and increase the stability of the subject invention.

In addition, the subject invention has ergonomic grips at the distal ends of the handle, as well as a means for adjusting the vertical dimension of the handle thereby accommodating a wide variety of users.

Since the side members of both the handle frame and the base frame preferably extend both rearwards and sidewards from the horizontal cross bar, the rear opening is spacious enough to permit wheelchair access. An added benefit of this configuration is the increased stability of the exercise device because of the improvement in weight distribution. A further advantage of this configuration is the ability of the user to perform a wide variety of exercises without the physical constraints of the prior art devices.

In one embodiment of the subject invention, the apparatus may include a reversible variable support step surface which may be releasably attached to the apparatus for enhancing the exercise routine of the user.

Other features of the subject invention will be apparent from the subsequent description, the accompanying drawings and the claims.

DETAILED DESCRIPTION OF THE PREFERRED EMBODIMENTS

Figure 1:
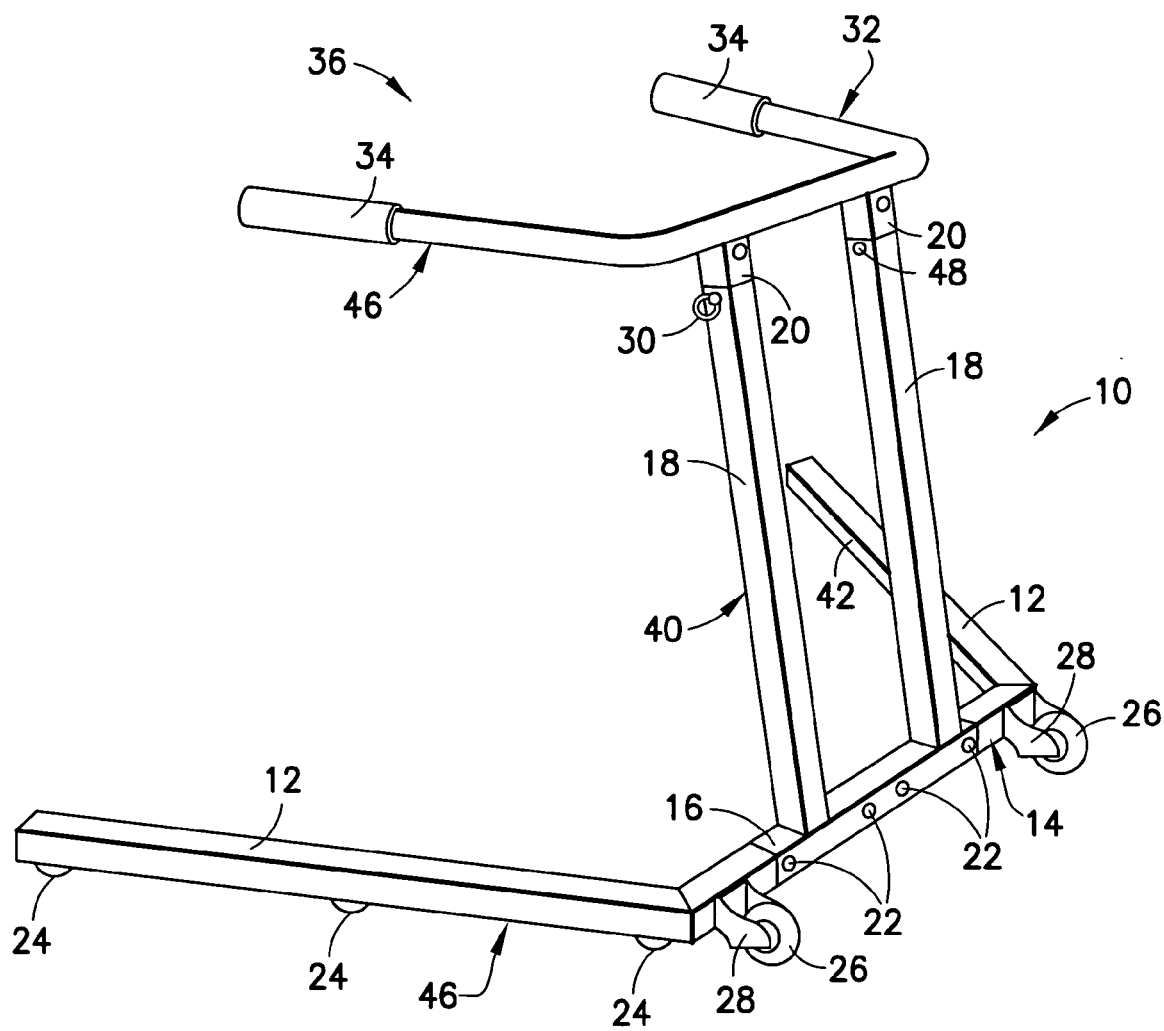
FIG. 1 is a perspective view of a first embodiment of the rehabilitation and fitness trainer of the subject invention.
Figure 2:
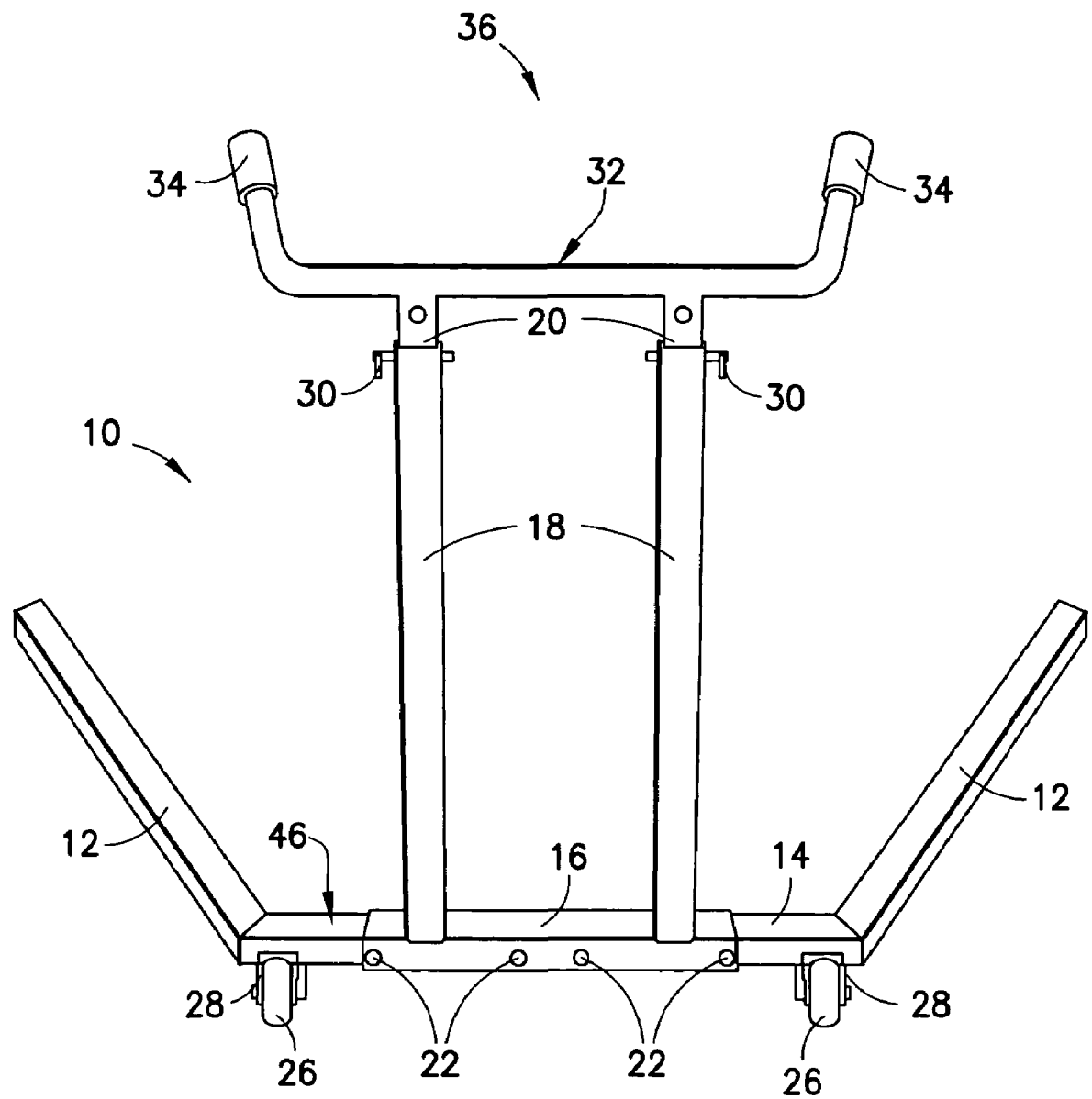
FIG. 2 is a front perspective view of the rehabilitation and fitness trainer of FIG. 1.
Figure 3:
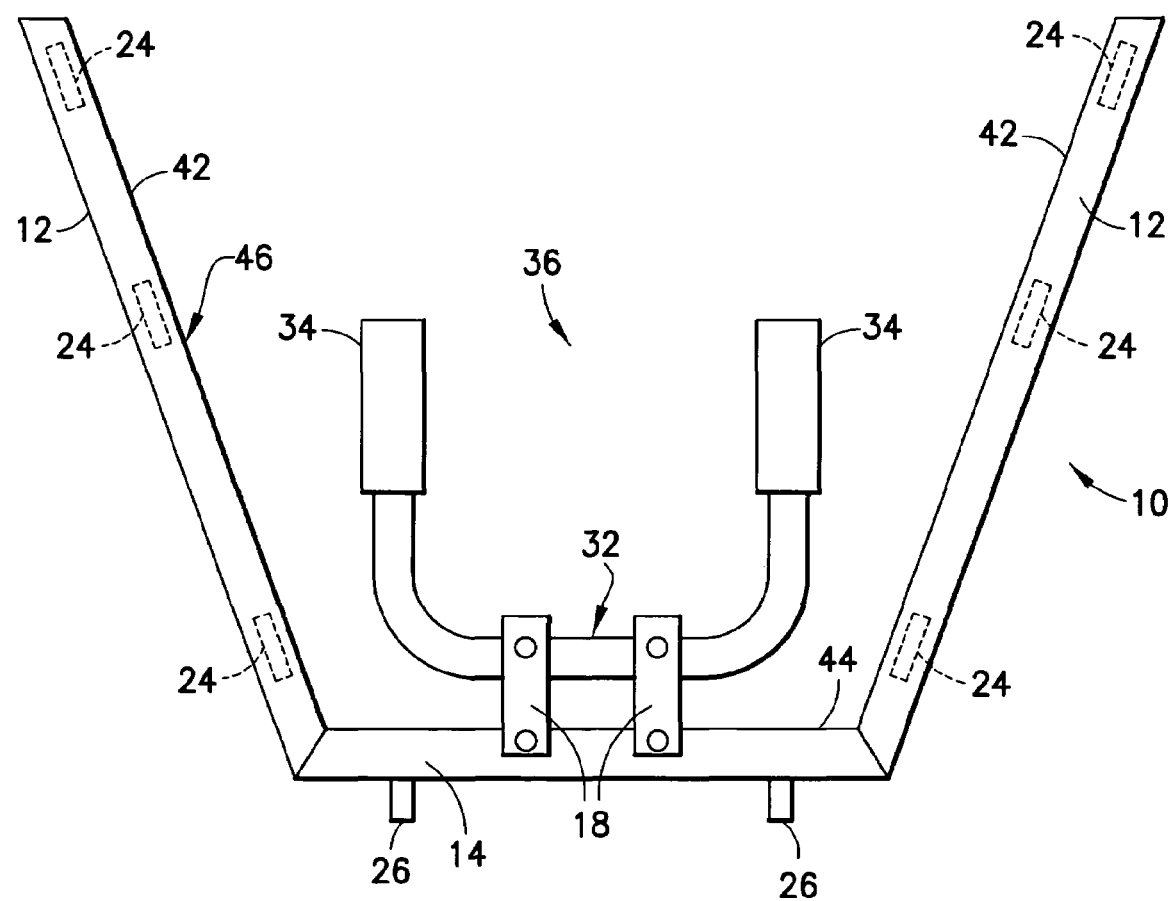
FIG. 3 is a top plan view of the rehabilitation and fitness trainer of FIG. 1.
Figure 4:
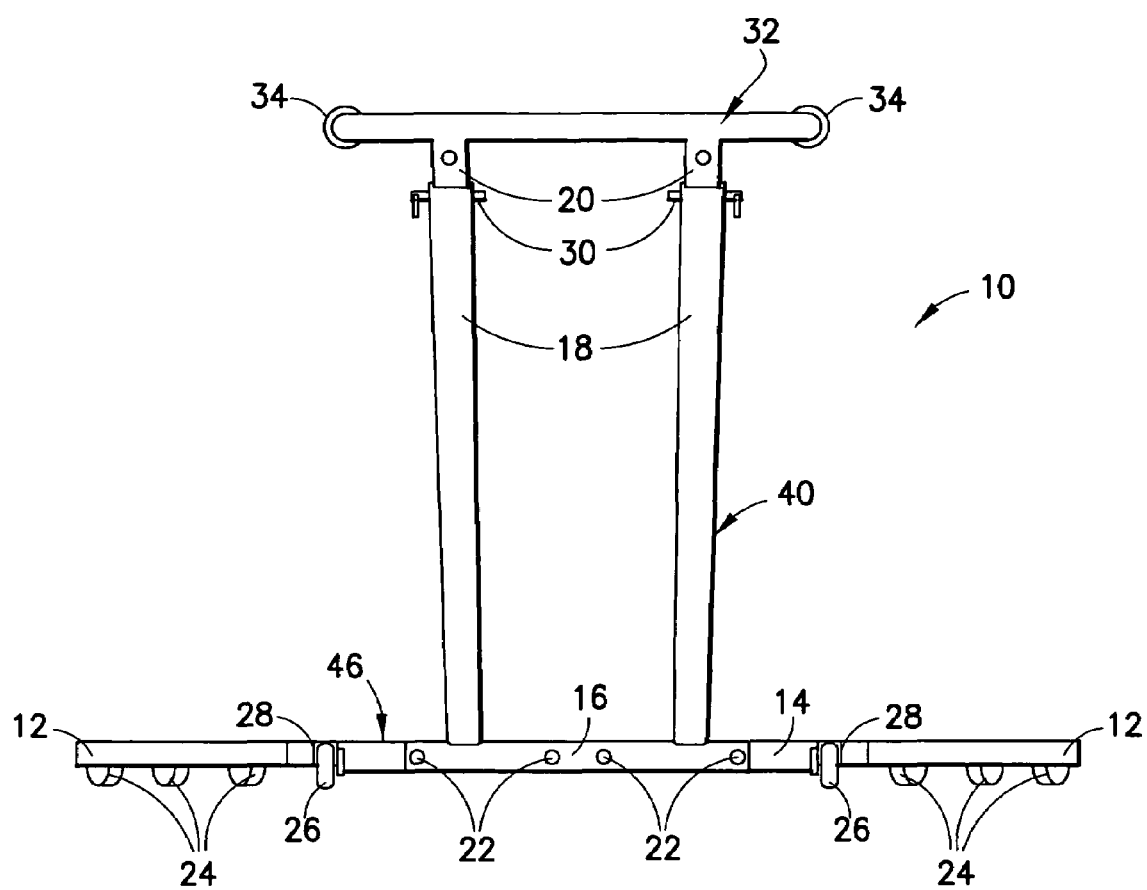
FIG. 4 is a front elevational view of the rehabilitation and fitness trainer of FIG. 1.

Referring to FIGS. 1-5, the first embodiment of the rehabilitation and fitness trainer of the subject invention is designated by the numeral 10. The apparatus 10 of the subject invention is intended for human use to aid in rehabilitation and personal training while providing a stable support mechanism for the individual user. The apparatus 10 is also designed to permit freedom of movement within the apparatus 10 and support the weight of the person using it.

The apparatus 10 comprises a plurality of base side members 12 with opposing ends, a cross bar 14 with opposing ends, a bracket 16, a plurality of vertical members 18 and hand grips 34. The base frame 46 of the apparatus 10 consists of the side members 12, 12, the bracket 16, the cross bar 14 and vertical members 18, 18. Attached to each end of the cross bar 14 is a side member 12. It is preferable that each side member 12 be removably affixed to each end of cross bar 14. However, permanently attaching side members 12, 12 to the cross bar 14 would still be within the scope of the subject invention. Both side members 12, 12 extend rearward, in the same direction as the open-end 36 of the handle frame 32. The side members 12, 12 may extend straight back while forming right angles with the cross bar 14. Preferably, the side members 12, 12 will be removably attached to the cross bar 14 and the distal ends of the side members 12, 12 are further apart from each other than the ends of said side members 12, 12 that are connected to the cross bar 14. Furthermore, the side members 12, 12 will preferably form an angle of 100-115 degrees as measured from the inside face 42 of each side member 12 and the rear face 44 of the cross bar 14 (see FIG. 3). Preferably, the angle is 105 degrees. By virtue of the outwardly spreading side members 12, 12, there is sufficient space within the space defined by the base frame 46 to allow a wheel chair bound user to maneuver the wheel chair into the confines of the apparatus 10 and thereafter grip the handle frame 32 and exercise their upper body.

It is preferred that the side members 12, 12 and the cross bar 14 be of a rectangular tubular design and manufactured from aluminum, steel or any other suitable material that can support the weight of a human body. The side members 12, 12 and cross bar 14 may also be manufactured from a solid block of material and in different shapes such as round, hexagonal or octagonal. A plurality of feet 24 are disposed on the underside of each side member 12 and separate the side member 12 from the floor support surface of the apparatus 10. Feet 24 help stabilize the apparatus 10 as well as protect the support surface from damage. The feet 24 are preferably formed from rubber, but may also be made from other suitable cushioning and non-skid materials, such as plastic or nylon.

As shown in FIGS. 1-5, a plurality of wheels 26 and a corresponding number of wheel brackets 28 are fixedly attached to the front face of the cross bar 14, with the rotational orientation of the wheel 26 being perpendicular to the longitudinal axis of the cross bar 14. When an individual is performing exercises, the apparatus 10 is stabilized by the side members 12, 12, the cross bar 14, and the feet 24. The tendency of the wheels 26 to roll is overcome by the feet 24 and the side members 12, 12. Before or after use, the individual may relocate the apparatus 10 by gripping the handle frame 32, tipping the apparatus 10 forwardly so as to lift the feet 24 off of the support surface and applying force in the forward direction. When the feet 24 are not in contact with the support surface, the wheels 26 will rotate freely and permit the apparatus 10 to be easily maneuvered by the user.

The bracket 16 is fixedly attached to the cross bar 14 by means of a plurality of fasteners 22. The bracket 16 is attached substantially in the center of the cross bar 14. This forms a symmetrical structure further increasing the overall stability of the apparatus 10. Extending vertically upward from the bracket 16 are a plurality of vertical members 18 formed from steel, aluminum or other suitable material for supporting the user's weight. These vertical members are tubular and may be rectangular, round, hexagonal or octagonal in shape. Preferably the vertical members 18, 18 are of a rectangular tubular construction and substantially parallel to one another. Furthermore, the vertical members 18, 18 are angled slightly in the rearward direction away from the wheels 26. The top of each vertical member 18 is open and a locking device 30 is disposed near the top of each vertical member 18. Each vertical member 18 has a pair of apertures 48 (see FIG. 5) that are circular and substantially parallel to each other so that a locking device 30 may be inserted therein. These apertures 48 are disposed near the top of the vertical member 18, on the sides of the vertical member 18 that are perpendicular to the cross bar 14. Also, the apertures 48 of each vertical member 18 are substantially parallel to the apertures 48 of the other vertical member 18 to maintain proper horizontal alignment of the handle 32. Attached to the base frame 46 is the mounting bracket 40 including the vertical members 18, 18, and attached to the upper portion of the mounting bracket 40 is the handle frame 32. The handle frame 32 includes cushioned grip portions 34, 34 and telescoping sections 20, 20. The telescoping sections 20, 20 are securely attached to the handle frame 32. The telescoping members 20 are formed in the same shape as the vertical members 18. Each telescoping member 20 may be either tubular or solid and manufactured from aluminum, steel or any other suitable structural material with the strength to support the user during the exercise routine.

Figure 5:
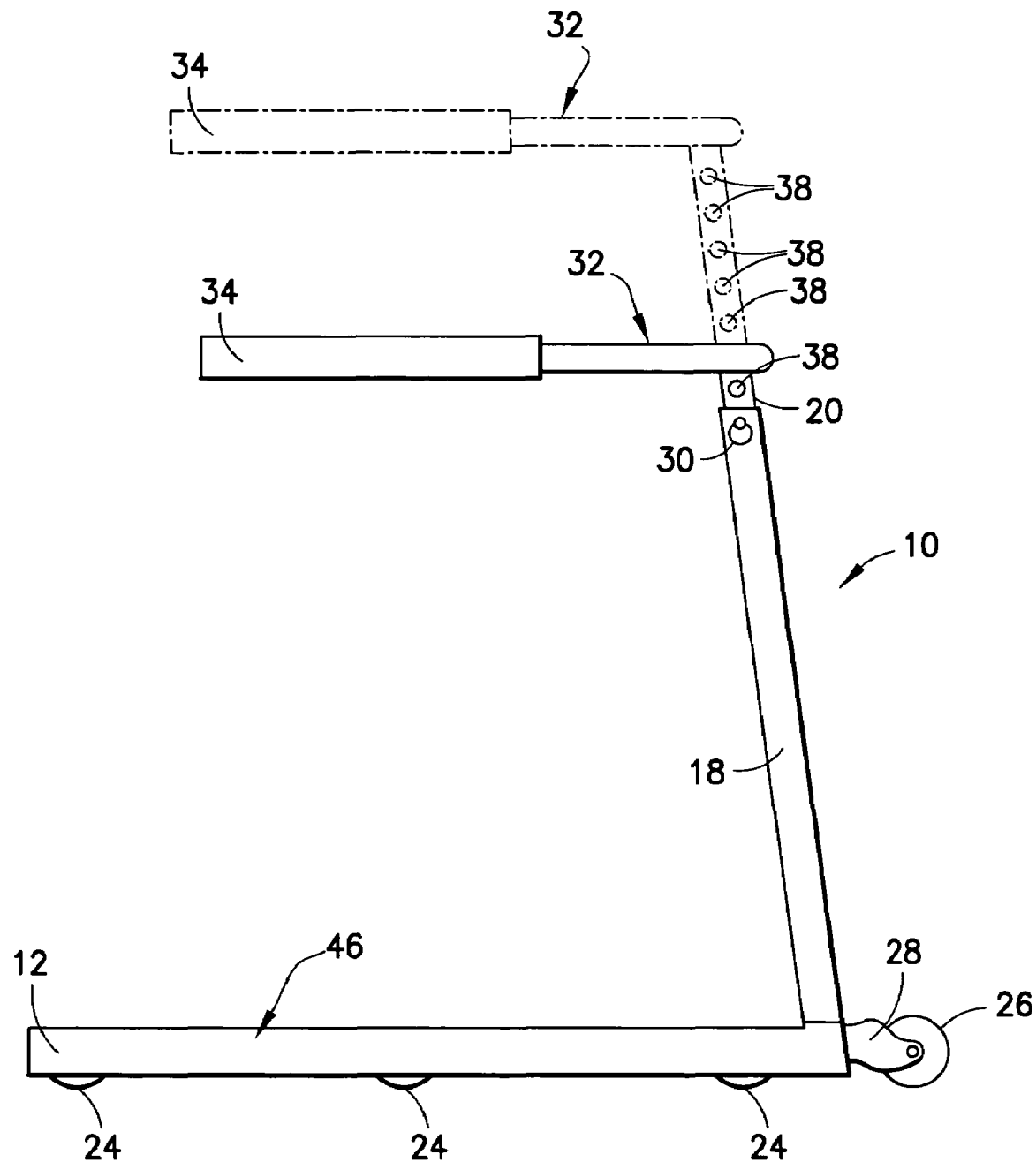
FIG. 5 is a side elevational view of the rehabilitation and fitness trainer of FIG. 1.

Furthermore, the telescoping members 20 are of sufficient length so that the apparatus 10 is adaptable to a wide audience of users. The lengths of the telescoping members 20 will be determined by the length of the vertical members 18. For proper symmetry, each telescoping member 20 will be the same length as the other, while each vertical member 18 will also have the identical length as the other vertical member 18. Additionally, each telescoping member 20 is sized so that it fits inside each vertical member 18 such that there exists sufficient clearance between the telescoping member 20 and the vertical member 18 for freedom of vertical telescoping motion. Each telescoping member 20 has a plurality of apertures 38 as seen in FIG. 5. These apertures 38 are substantially circular and evenly spaced along the telescoping member 20, so that they are disposed on the sides of the telescoping member 20 that are perpendicular to the bracket 16. The apertures 38 are disposed along the telescoping member 20 so that the pairs of apertures 38 are substantially parallel to each other to permit a locking device 30 to be inserted therein. The locking device 30 is preferably a rod with a through hole at one end, a ring attached at the opposite end and secured by a cotter pin. However other means of securing the telescoping members 20 to the vertical members 18 may be employed.

In the preferred embodiment, when the user adjusts the height of the handle frame 32, the locking devices 30 are removed by the user, the handle frame 32 is raised or lowered to the desired height, and the locking devices 30 are inserted through the apertures 48 of the vertical members 18, 18 and the apertures 38 in the telescoping members 20, 20. The handle 32 is now at the desired height for the user and locked into position.

The handle frame 32 is preferably a round tubular material such as steel, aluminum or another material selected for its strength and is generally U-shaped. It will preferably be formed from the same material as the side members 12. At the free ends of the handle frame 32 are ergonomic coverings of rubber, foam or any other known resilient material disposed to form gripping sections 34. An open-end 36 exists at the distal ends of the handle frame 32 between the gripping sections 34, 34. In use, the user will enter the open-end 36 of the apparatus 10 and grasp the gripping sections 34 for support while performing exercises. The open-end 36 is of sufficient size to permit a number of different body sizes to enter and perform their exercises, including users who require a wheel chair. The open-end of the base frame 46 is sufficiently wide to enable a wheel chair to extend into the base frame to facilitate the user being in a position to comfortably use the apparatus 10.

The apparatus 10 assists a person who has balance difficulty, has weakness in their lower extremities, or is in a rehabilitation mode following an injury or surgery. The subject invention may also be used by a healthy individual for added support while exercising. The apparatus 10 can be used by an individual at a fitness center, physical therapy center, home gym or any location one would like to place it. It can be used one at a time, or many may be set up and used in an aerobics class format.

FIGS. 6-12 illustrate an alternate embodiment of the subject rehabilitation and fitness training apparatus. The second embodiment is of more stylized design, however, it also includes the basic components of a handle frame which is generally U-shaped in configuration, with two telescopic members attached at an angle to the base of the U-shaped handle portion; a generally U-shaped base frame including an elongated cross bar and two side members which extend rearwardly and at an outwardly extending angle from the elongated cross bar, and with the cross bar including a pair of elongated members that extend generally upwardly and rearwardly for cooperating and telescopically engaging the pair of telescopic members extending from the handle frame, and with a locking device being provided for vertically adjusting and maintaining the vertical distance between the handle frame and the base frame in order to accommodate a wide variety of users of the apparatus.

Figure 10:
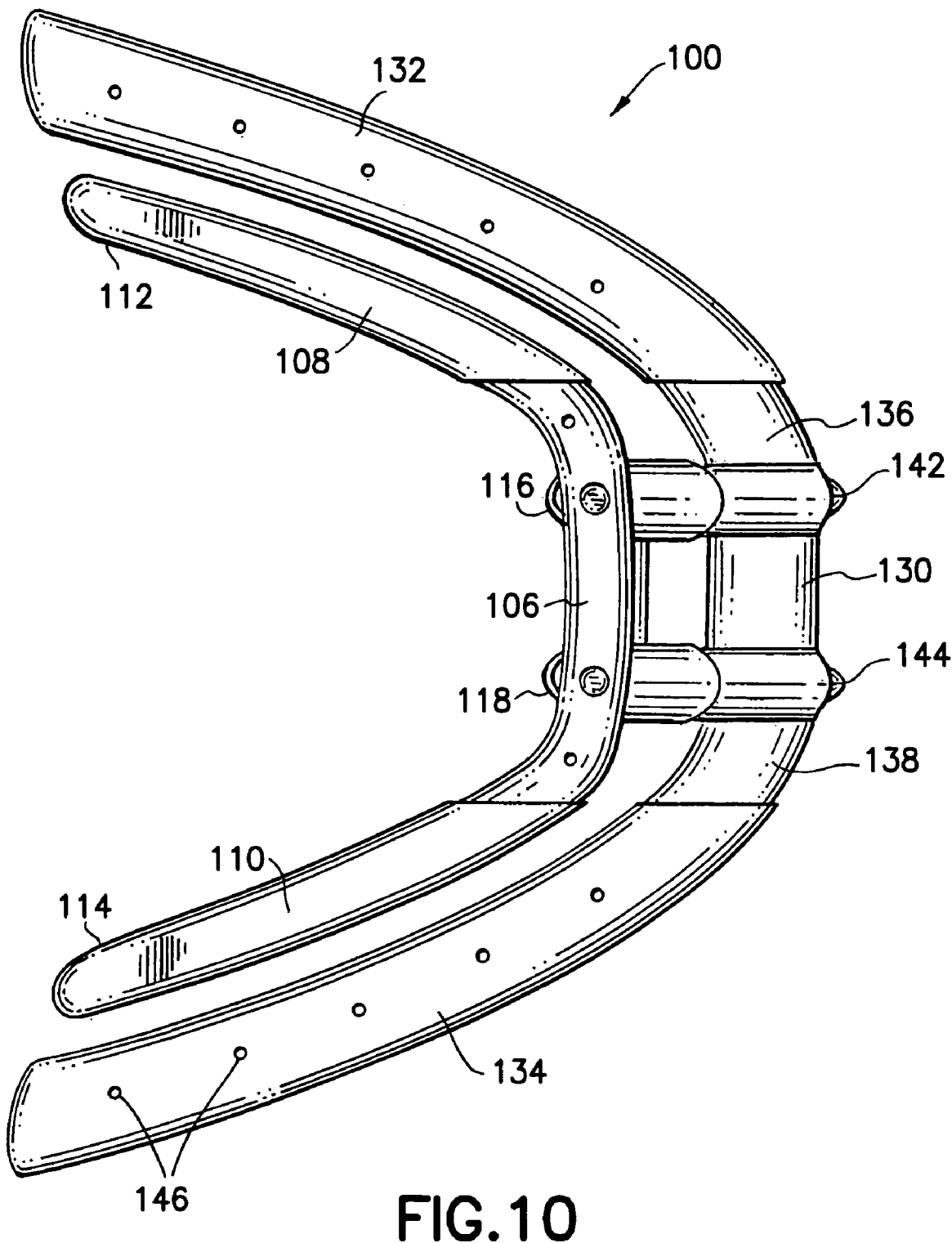
FIG. 10 is a top plan view of the rehabilitation and fitness trainer of FIG. 6.

Furthermore, the side members of the base frame extend rearwardly and angularly outwardly from the cross bar, with the foot print or envelope of the base frame being greater in size than the foot print or configuration of the handle frame, and this feature is specifically illustrated in FIG. 10.

In both embodiments, wheels or rollers are provided and secured to the cross bar member of the base frame in order to facilitate tipping and rolling of the exercise apparatus along the floor to a different location. In order to further facilitate movement of the portable exercise apparatus, the embodiment in FIGS. 6-10 includes a hand grip lever to facilitate tipping and pulling of the apparatus as it is rolled to a different location.

In the alternative embodiment of FIGS. 6-10, the distal ends of the handle frame may extend downwardly to assist the user in gripping the apparatus and moving to a vertical position for undergoing various exercises. As in the case of the embodiment of FIGS. 1-5, the distal ends of the handle portion may include cushion material to aid in the comfort of the user.

Figure 11:
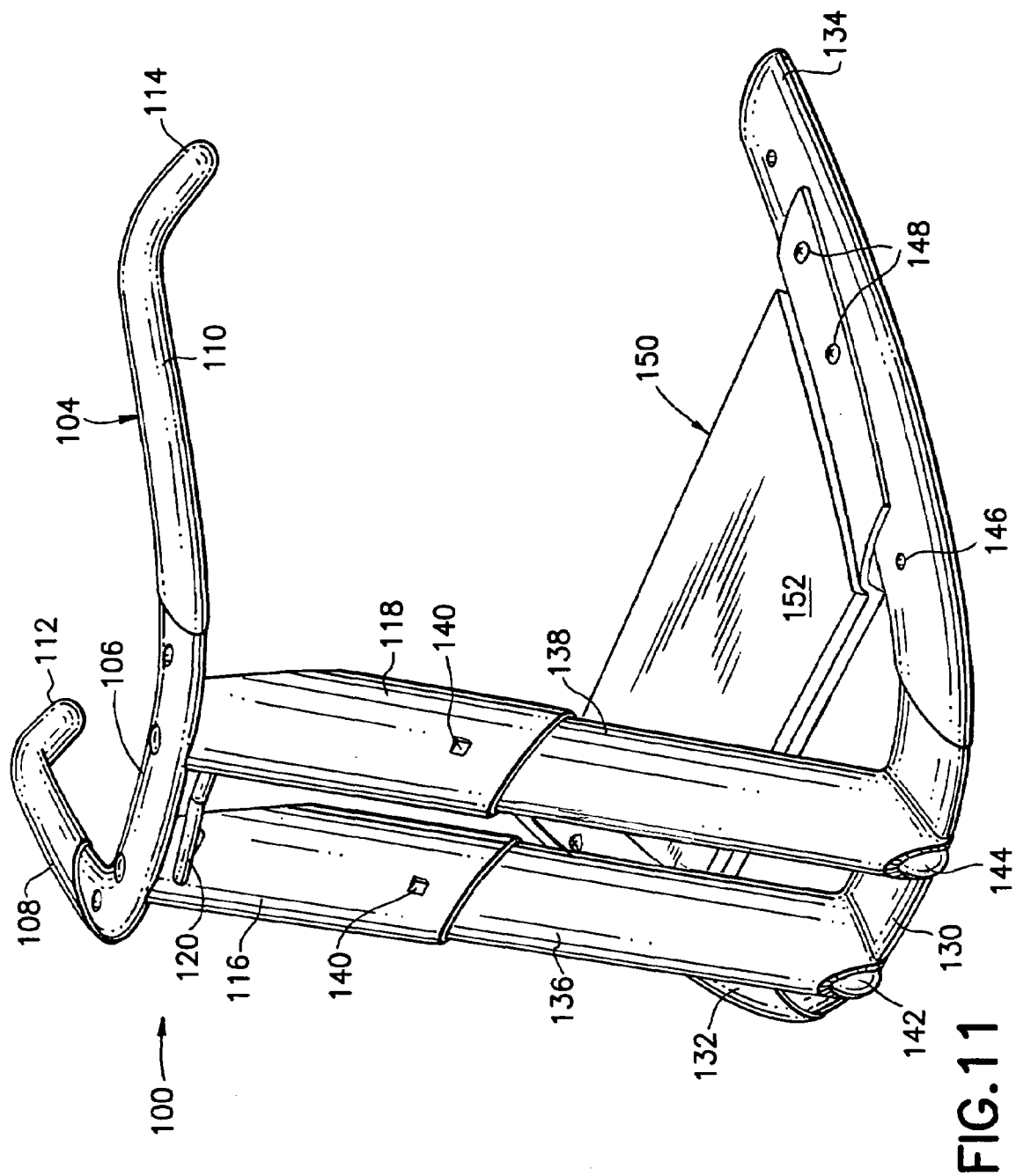
FIG. 11 is a front perspective view of the rehabilitation and fitness trainer of FIG. 6, and with a variable support step surface being releasably attached to the trainer.

A supplemental feature of the embodiment of FIGS. 6-10 of the subject portable exercise device is the provision of openings or slots along the length of the upper surface of the outwardly extending side members, with the slots being spaced to engage suitable projections provided on a variable support surface. In one position of the variable support surface, as shown in FIG. 11, the surface provides a low step to aid the user in various exercises.

Figure 12:
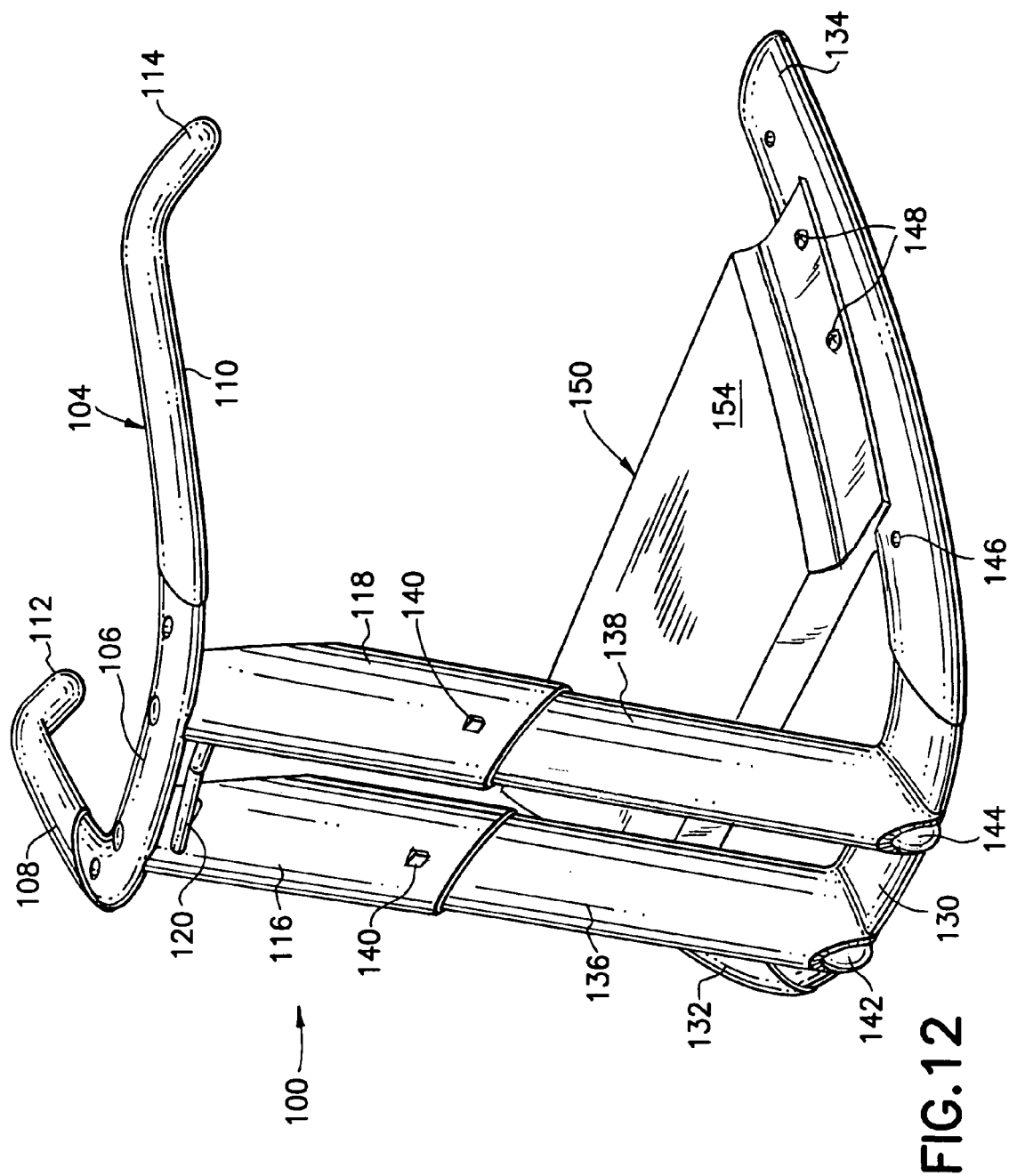
FIG. 12 is a front perspective view of the rehabilitation and fitness trainer of FIG. 6 with the variable support step surface being positioned so as to create a step at the base frame of the trainer.

The variable support surface may be inverted to a position as shown in FIG. 12 wherein the step is of greater height and provides an exercise step for the user while exercising on the portable exercise apparatus.

Figure 6:
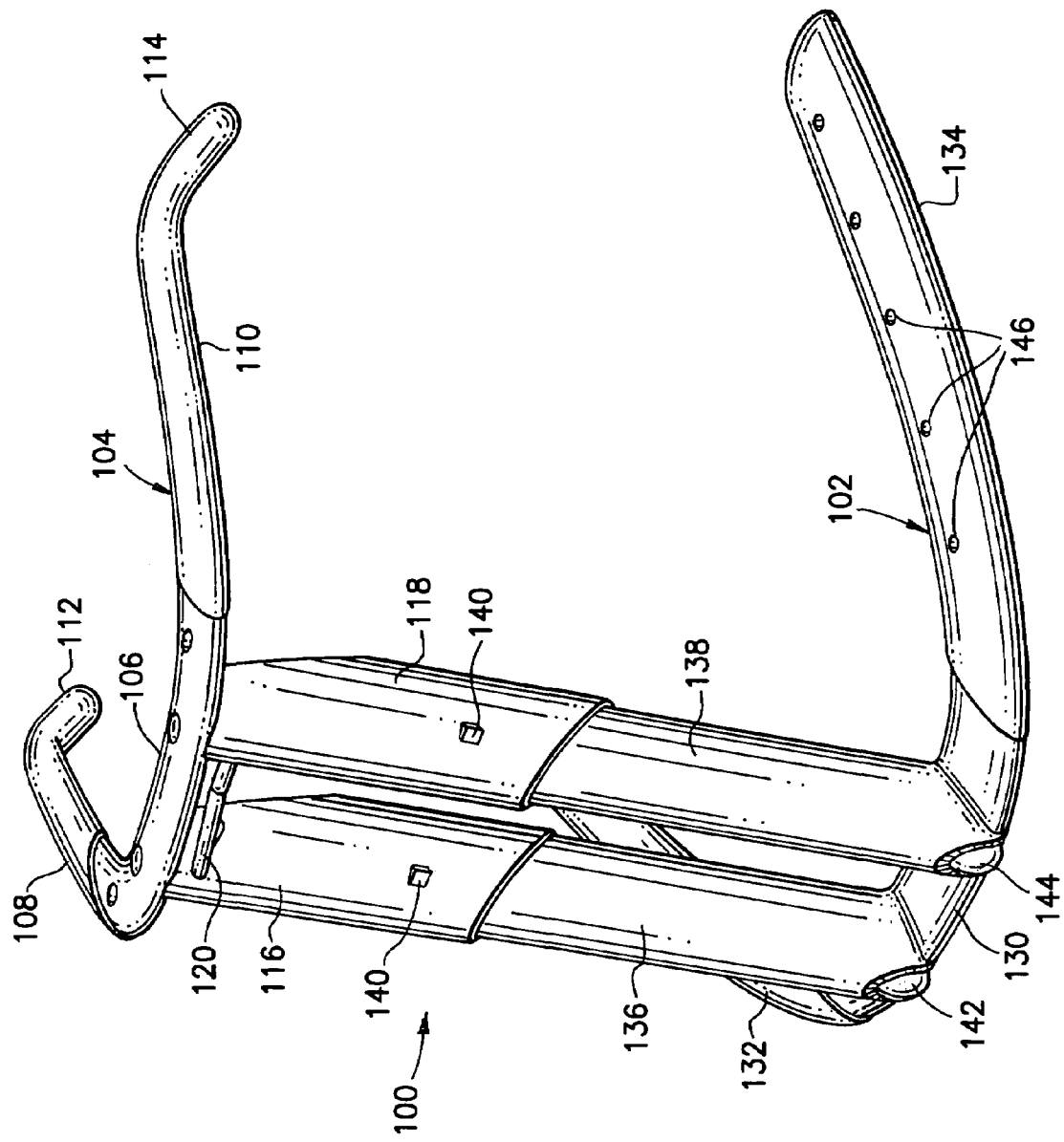
FIG. 6 is a front perspective view of a second embodiment of the rehabilitation and fitness trainer of the subject invention.
Figure 7:
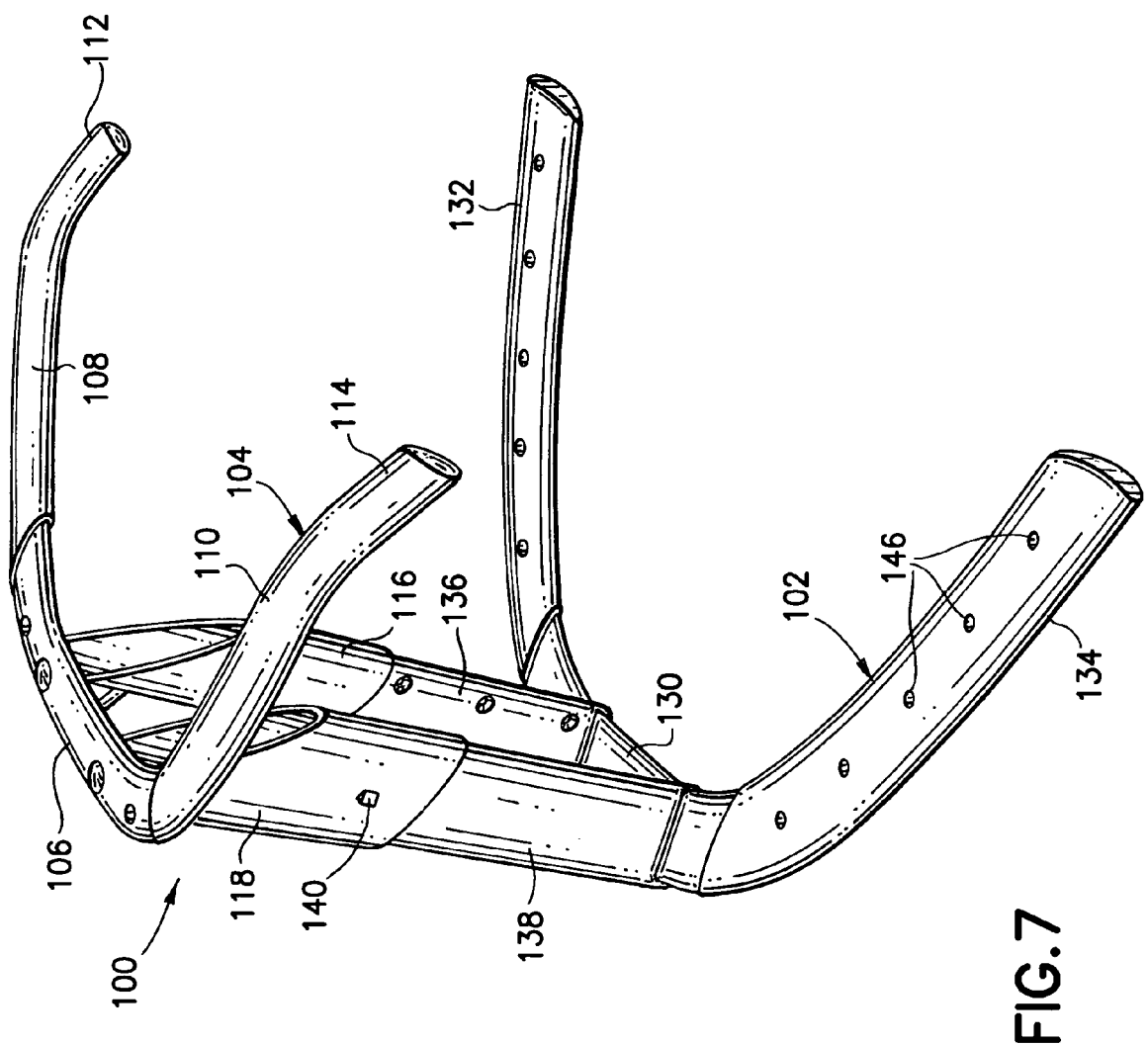
FIG. 7 is a rear perspective view of the rehabilitation and fitness trainer of FIG. 6.
Figure 8:
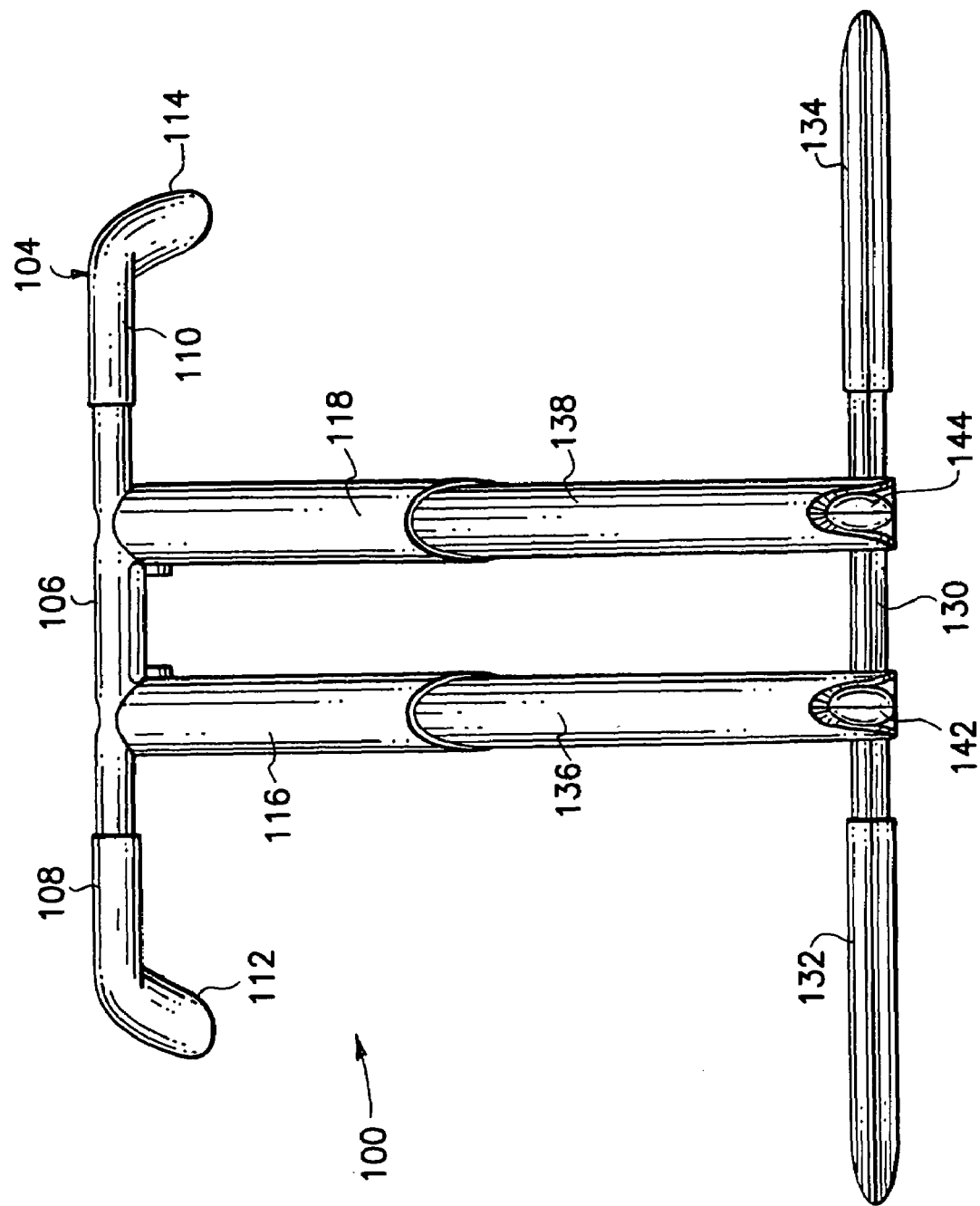
FIG. 8 is a front elevational view of the rehabilitation and fitness trainer of FIG. 6.
Figure 9:
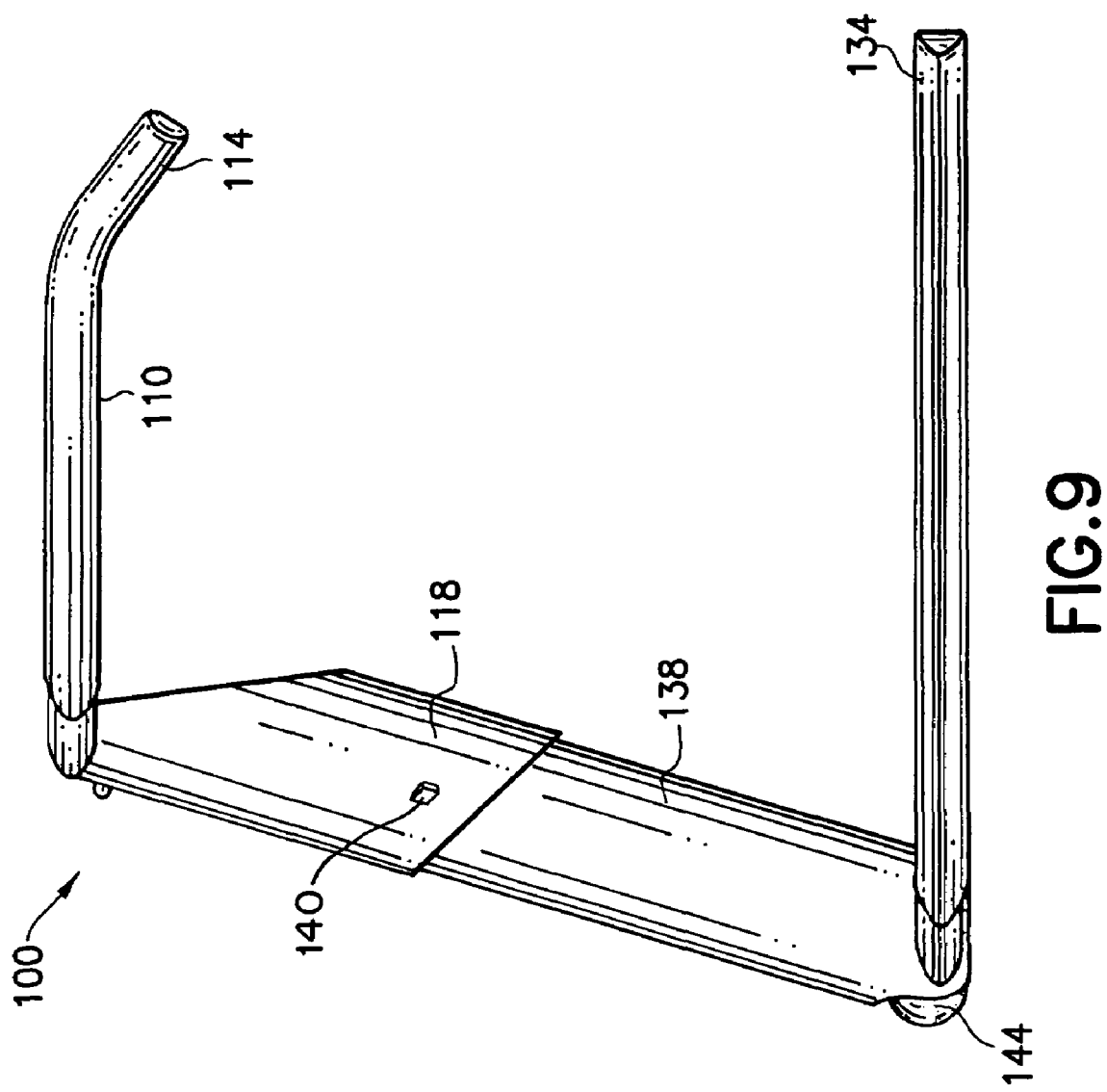
FIG. 9 is a side elevational view of the rehabilitation and fitness trainer of FIG. 6.

Referring to FIG. 6, the portable exercise apparatus of the second embodiment is generally designated by the numeral 100. The rehabilitation and fitness exercise apparatus 100 includes generally U-shaped handle frame 104 and generally U-shaped base frame 102.

The generally U-shaped handle frame 104 includes a base member 106 and a first arm 108 and a second arm 110. The handle frame 104 is disposed generally parallel to the floor, with the distal ends 112, 114 being angled downwardly to assist the user in engaging the apparatus 100 and for various exercises. The distal ends 112, 114 may be covered with a cushion material to aid in the comfort of the user.

Secured to the base 106 of the handle frame 104 and extending downwardly and forwardly are a pair of telescopic members 116 and 118. Extending between the telescopic members 116 and 118 is a hand lever grip 120 which is used when the portable rehabilitation and fitness exercise apparatus 100 is to be moved to a different location on the floor of the facility.

The arms 108 and 110 extend rearwardly and angularly outwardly relative to each other, with the angle between the longitudinal axis of each arm and the longitudinal axis of the base 106 being in the range of 100 degrees to 120 degrees and, preferably, 105 degrees.

The generally U-shaped base frame 102 includes a cross bar 130, and two rearwardly and outwardly angularly extending side members 132 and 134. As in the case of the handle frame 104, the side members extend at an angle of approximately 100 degrees to 120 degrees relative to the longitudinal axis of the cross bar 130 and, preferably, at an angle of 105 degrees. As illustrated in the plan view of the apparatus 100 in FIG. 10, the overall configuration of the handle frame 104 is smaller than the overall configuration of the base frame 102, thereby providing an enlarged opening to facilitate a wheel chair bound user to be positioned within the confines of the exercise apparatus 100. In addition, this aids the user in having more space for movement of his or her feet during various exercises. Fixedly secured to and extending upwardly and rearwardly from the cross bar member 130 are a pair of elongated members 136 and 138 which are spaced to telescopically engage the telescopic members 116 and 118 extending from the handle frame 104.

Locking devices, designated by the numeral 140, are provided in order to fix the telescopic members 116 and 118 to the telescopic struts 136 and 138 in order to enable the user to adjust the vertical height between the base frame 102 and the handle frame in order to accommodate a wide variety of different height users of the rehabilitation and fitness exercise apparatus 100.

Also, to facilitate movement of the exercise apparatus to various positions along the floor of the facility, rollers 142, 144 are provided in the cross bar member 130. In order to move the exercise apparatus 100, a trainer would grip the lever 120 and tilt the exercise apparatus 100 so that the rollers 142, 144 engage the floor and, thereafter, the trainer would pull the exercise apparatus while on the rollers to a different position on the floor.

Disposed in the upper surface of each of the side members 132, 134 are a plurality of spaced openings or slots 146 which are adapted to receive projections 148 (see FIGS. 11 and 12) extending from the variable support surface 150, as shown in FIGS. 11 and 12. The variable support surface 150 extends between the side members 132, 134 and the projections 148 engage the openings 146 in the side members 132, 134. In one position of the vertical support surface 150, as shown in FIG. 11, the top surface 152 of the variable support surface 150 essentially corresponds to the top surface of the side members 132, 134, and thus provide a slight step or platform for use by the user during various exercise.

The variable support surface may be inverted to the position as shown in FIG. 12, and similar projections 148 extending from the vertical support surface 150 engage the slots 146 in the side members 132, 134, with the opposite surface 154 of the variable support surface 150 being vertically higher than the top surface of the side members 132, 134, thereby providing a higher step for use by the user during his or her exercise regimen.

As in the first embodiment of the subject invention, suitable stabilizing feet (not shown) may be provided on the lower surfaces of base frame side members 132 and 134.

Although the invention has been described with respect to specific embodiments of the apparatus, it is readily apparent that modifications may be made without departing from the spirit and scope of the invention as defined by the following claims.

What is claimed is:

1. A portable exercise apparatus, for use on a floor, comprising:

a handle frame having a generally U-shaped handle portion, said handle portion having a base member, a first arm and a second arm, the plane of said handle portion being generally horizontal to the floor, said handle frame further including two telescopic members attached at an angle to the plane of said U-shaped handle portion;

a generally U-shaped base frame, positioned on said floor, having an elongated cross bar and two side members extending rearwardly from said elongated cross bar, said side members extending outwardly relative to each other, each said side member being disposed radially outwardly from said cross bar such that the planar configuration of the base frame is greater than the planar configuration of the handle frame, said base frame including a pair of elongated members extending generally upwardly and rearwardly from said cross bar, said pair of elongated members telescopically engaging said two telescopic members of the handle frame, said first arm and said second arm of said handle frame being cantilevered from said base member; and a locking device for maintaining the vertical dimension between the handle frame and said base frame thereby accommodating a wide variety of users of the apparatus.

2. A portable exercise apparatus as in claim 1, wherein each said side member forms an angle between 100 and 115 degrees with the longitudinal axis of the elongated cross bar.

3. The portable exercise apparatus of claim 2, wherein the angle is 105 degrees.

4. The portable exercise apparatus of claim 1, wherein a pair of wheels are disposed on the front of said elongated cross bar for facilitating movement of the apparatus on the floor.

5. The portable exercise apparatus of claim 1, wherein a plurality of feet is disposed on the bottom side of each said side member of the generally U-shaped base frame.

6. The portable exercise apparatus of claim 1, wherein a gripping section at the distal end of each arm is covered with a cushioning material.

7. The portable exercise apparatus of claim 1, further including a variable support surface releasably connected to and extending between the two side members of the U-shaped base frame.

8. The portable exercise apparatus of claim 6, wherein the cushioned gripping sections of each arm extend downwardly at an acute angle relative to the plane of the handle frame.

9. A portable exercise apparatus, for use on a floor, comprising:

a handle frame having a generally U-shaped handle portion, said handle portion having a base member, a first arm and a second arm, the plane of said handle portion being horizontal to the floor, said handle frame further including two telescoping members attached at an angle to the plane of said U-shapped handle portion;

a generally U-shaped base frame, positioned on said floor, having an elongated cross bar and two side members extending rearwardly from said elongated cross bar, said side members extending outwardly relative to each other, each said side member being disposed radially outwardly from said cross bar such that the planar configuration of the base frame is greater than the planar configuration of the handle frame, a mounting bracket attached to said elongated cross bar, said mounting bracket including a pair of elongated members extending generally upwardly and rearwardly from said mounting bracket; said elongated members telescopically receiving said telescoping members of the handle frame, said first arm and said second arm of said handle frame being cantilevered from said base member; and an adjusting device for adjusting the vertical dimension between the handle frame and said base frame thereby accommodating a wide variety of users of the apparatus.

10. A portable exercise apparatus as in claim 9, wherein each said side member forms an angle between 100 and 115 degrees with the longitudinal axis of the elongated cross bar.

11. The portable exercise apparatus of claim 10, wherein the angle is 105 degrees.

12. The portable exercise apparatus of claim 9, wherein the two side members are removably attached to the elongated cross bar of the U-shaped base frame.

13. The portable exercise apparatus of claim 9, wherein a pair of wheels are disposed on the front of said elongated cross bar for facilitating movement of the apparatus on the floor.

14. The portable exercise apparatus of claim 9, wherein a plurality of feet is disposed on the bottom side of each said side member of the generally U-shaped base frame.

15. The portable exercise apparatus of claim 9, wherein a gripping section at the distal end of each arm is covered with a cushioning material.

16. The portable exercise apparatus of claim 9, further including a variable support surface releasably connected to and extending between the two side members of the U-shaped base frame.

17. The portable exercise apparatus of claim 15, wherein the cushioned gripping sections of each arm extend downwardly at an acute angle relative to the plane of the handle frame.

18. A portable exercise apparatus, for use on a floor, comprising:

a handle frame having a generally U-shaped handle portion, said handle portion having a base member, a first arm and a second arm, the plane of said handle portion being generally horizontal to the floor, said handle frame further including at least one telescoping member attached at an angle to the generally horizontal plane of said U-shaped handle portion;

a generally U-shaped base frame, positioned on said floor, having an elongated cross bar and two side members extending rearwardly from said elongated cross bar, said side members extending outwardly relative to each other, each said side member being disposed radially outwardly from said cross bar such that the planar configuration of the base frame is greater than the planar configuration of the handle frame, said base frame including at least one elongated member extending generally upwardly and rearwardly from said cross bar, said at least one elongated member telescopically engaging said at least one telescoping member of the handle frame, said first arm and said second arm of said handle frame being cantilevered from said base member; and an adjusting device connected to said telescoping members for varying the vertical dimension between the handle frame and said base frame thereby accommodating a wide variety of users of the apparatus.

19. A portable exercise apparatus as in claim 18, wherein each said side member forms an angle between 100 and 115 degrees with the longitudinal axis of the elongated cross bar.

20. The portable exercise apparatus of claim 19, wherein the angle is 105 degrees.

21. The portable exercise apparatus of claim 18, wherein a pair of wheels are disposed on the front of said elongated cross bar for facilitating movement of the apparatus on the floor.

22. The portable exercise apparatus of claim 18, wherein a plurality of feet is disposed on the bottom side of each said side member of the generally U-shaped base frame.

23. The portable exercise apparatus of claim 18, wherein a gripping section at the distal end of each arm is covered with a cushioning material.

24. The portable exercise apparatus of claim 18, further including a variable support surface releasably connected to and extending between the two side members of the U-shaped base frame.

25. The portable exercise apparatus of claim 23, wherein the cushioned gripping section of each arm extends downwardly at an acute angle relative to the plane of the handle frame.

* * * * *